April 22, 1969 E. C. KARRAS ET AL 3,440,593

CARD EXTENDER

Filed May 4, 1967

·TOP VIEW·

INVENTORS
E.C. KARRAS
R.P. DICIUS
BY D B Warner
ATTORNEY

United States Patent Office 3,440,593
Patented Apr. 22, 1969

3,440,593

CARD EXTENDER

Ernest C. Karras, Chicago, and Renualdas P. Dicius, Hinsdale, Ill., assignors to International Telephone and Telegraph Corporation, New York, N.Y., a corporation of Maryland Filed May 4, 1967, Ser. No. 636,124
Int. Cl. H05k *1/04, 7/00;* H01r *19/00*
U.S. Cl. 339—17 3 Claims

ABSTRACT OF THE DISCLOSURE

An extender is provided to support a printed circuit card in a position outside a rack while providing electrical connections to circuits in the rack. By providing support for a card outside the rack in this manner, direct inspection and testing of circuits on the card under operating conditions is possible.

This invention relates to apparatus for use in placing printed circuit boards in position to be tested and particularly to apparatus for holding boards in a position to enable tests to be conducted while circuits on the boards are connected to other circuits in an enclosed rack.

Figure 1:
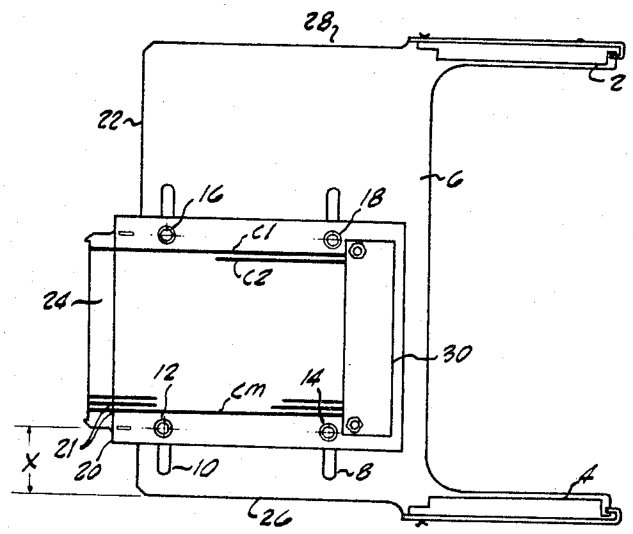
Figure 2:
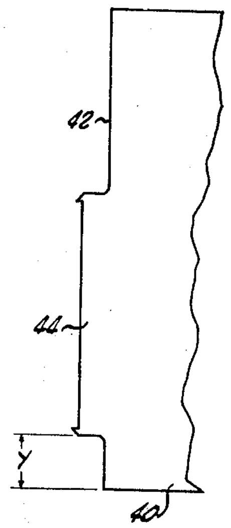
Figure 3:
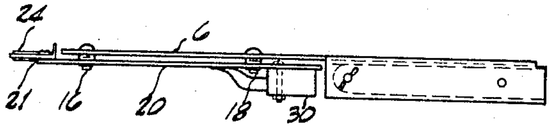

Various aspects of this invention will be understood from the description alone and others will be better understood by reference to the attached figures, in which:

FIG. 1 discloses a plan view of a card extended in accordance with the invention, FIG. 2 represents a portion of a printed circuit card as it would be positioned prior to insertion in the card extender, and FIG. 3 is a top view of the card extender of FIG. 1.

A card extender is shown in plan view in FIG. 1. It includes a PC, or printed circuit, card guide formed by card guide elements 2 and 4 supported on a frame 6. The guide is dimensioned to accept a PC card (referred to herein as a "large" card) of substantially the same dimensions as frame 6. The frame 6 includes slots at 8 and 10 through which rivets at 12, 14, 16 and 18 pass to support a small PC card 20. The card 20 can be slid along the slots 8 and 10 into various positions parallel to the leading edge 22 of the frame 6.

The small PC card 20 incorporates a plurality of conductors at C1, C2 . . . C*n* which are each soldered along an edge at 21 to a corresponding individual contact, or conductor, on a male PC connector at 24. The contacts at 24 are selected to mate with female contacts in a rack or box (not shown). The rack or box is designed to accept PC connectors for a plurality of similar printed circuit cards and to provide electrical interconnections between the cards. The large printed circuit cards have the same outside dimensions as does frame 6 between the edges 26 and 28. Each of the large cards in such a rack will be connected to the rack through connecting elements on a PC connector like connector 24.

A printed circuit card (PC card) supporting components of a circuit is represented at 40 in FIG. 2. This card carries on its edge 42 a male PC connector 44 which is identical to connector 24 in FIG. 1. The connector 44 is designed to fit into a female PC connector at 30. When card 40 is fitted between elements 2 and 4 in FIG. 1, connector 44 is mated with connector 30. Connector 24 may be mated with a connector (not shown) in the rack by sliding PC 20 along the slots 8 and 10, so that the circuits in the board 40 connect with the correct circuits in the rack. In such a configuration, circuits associated on card 40 are accessible to be tested while they are operatively connected to circuits in the rack.

In order to assure that each printed circuit board can be placed only in one particular position of the rack (not shown) each of the connectors 44 for the boards 40 is spaced at a different distance Y from the edge of the rack. The card extender is then adapted to a particular board 40 by sliding the small card 20 along the slots 8 and 10 until the distance X is equal to the corresponding distance Y.

While the principles of the invention have been described above in connection with specific apparatus and applications, it is to be understood that this description is made only by way of example and not as a limitation on the scope of the invention.

What is claimed is:

1. A card extender for mechanically fastening a printed circuit board to a rack in a position accessible for testing outside the rack and for simultaneously completing electrical connections between circuits in said printed circuit board and circuits in said rack, said card extender comprising:
   - a frame,
   - means supporting a printed circuit connector card on said frame and permitting said card to be moved back and forth across said frame,
   - said printed circuit connector card supporting male connectors on one end and female connectors on the opposite end, and
   - means on said connector card electrically interconnecting said male and female connectors.

2. A card extender as claimed in claim 1, in which said means for supporting a card and permitting it to be moved across said frame includes,
   - a pair of slots across the face of said frame, and
   - a pair of rivets extending through said card and said slots to permit motion along the slots between the card and the frame.

3. A card extender as claimed in claim 1, in which the frame supports a pair of card guide elements, and said card guide elements are aligned to accept a printed circuit board,
   - whereby a printed circuit board may be connected through the card extender to a rack.

References Cited

UNITED STATES PATENTS

| | | |
|---|---|---|
| 2,951,185 | 8/1960 | Buck. |
| 2,952,810 | 9/1960 | Helton. |
| 3,147,054 | 9/1964 | Alexander et al. |

MARVIN A. CHAMPION, *Primary Examiner.*

P. A. CLIFFORD, *Assistant Examiner.*

U.S. Cl. X.R.

339—151, 176; 317—101; 324—158